United States Patent
Ueda

(10) Patent No.: US 11,669,287 B2
(45) Date of Patent: Jun. 6, 2023

(54) NON-TRANSITORY COMPUTER-READABLE STORAGE MEDIUM AND EDIT PROCESSING METHOD

(71) Applicant: BROTHER KOGYO KABUSHIKI KAISHA, Nagoya (JP)

(72) Inventor: Hideaki Ueda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/512,636

(22) Filed: Oct. 27, 2021

(65) Prior Publication Data

US 2022/0129221 A1  Apr. 28, 2022

(30) Foreign Application Priority Data

Oct. 28, 2020 (JP) .............................. JP2020-180353

(51) Int. Cl.
  *G06F 3/12* (2006.01)
(52) U.S. Cl.
  CPC .......... *G06F 3/1256* (2013.01); *G06F 3/1208* (2013.01); *G06F 3/1243* (2013.01)
(58) Field of Classification Search
  CPC .... G06F 3/1256; G06F 3/1208; G06F 3/1243; G06F 3/1253; G06F 3/1284
  See application file for complete search history.

(56) References Cited

U.S. PATENT DOCUMENTS

| | | | | |
|---|---|---|---|---|
| 2002/0197090 | A1* | 12/2002 | Akaiwa | B41J 3/4075 400/615.2 |
| 2009/0073467 | A1 | 3/2009 | Iida | |
| 2014/0307268 | A1* | 10/2014 | Sun | G06F 3/1253 358/1.6 |
| 2020/0406633 | A1* | 12/2020 | Yuasa | G06F 3/1256 |

FOREIGN PATENT DOCUMENTS

| | | |
|---|---|---|
| JP | 2003-1896 A | 1/2003 |
| JP | 2009-83460 A | 4/2009 |
| JP | 2010-17937 A | 1/2010 |

* cited by examiner

*Primary Examiner* — Iriana Cruz
(74) *Attorney, Agent, or Firm* — Kenealy Vaidya LLP

(57) ABSTRACT

A terminal device is connected to a printing device on which a medium storage body accommodating a print medium is mounted. The printing device performs desired printings with using different types of the print media, and prepares a plurality of print labels which are laid and pasted in a thickness direction of the print labels to constitute a print label body. The terminal device receives a color-code setting for each of a plurality of regions provided on the print label body, determines a color setting on each of the plurality of print labels so as to realize a color-coding on the print label body corresponding to the received color-code setting, and displays, on a display unit of the terminal device, the determined color setting on the plurality of print labels.

12 Claims, 17 Drawing Sheets

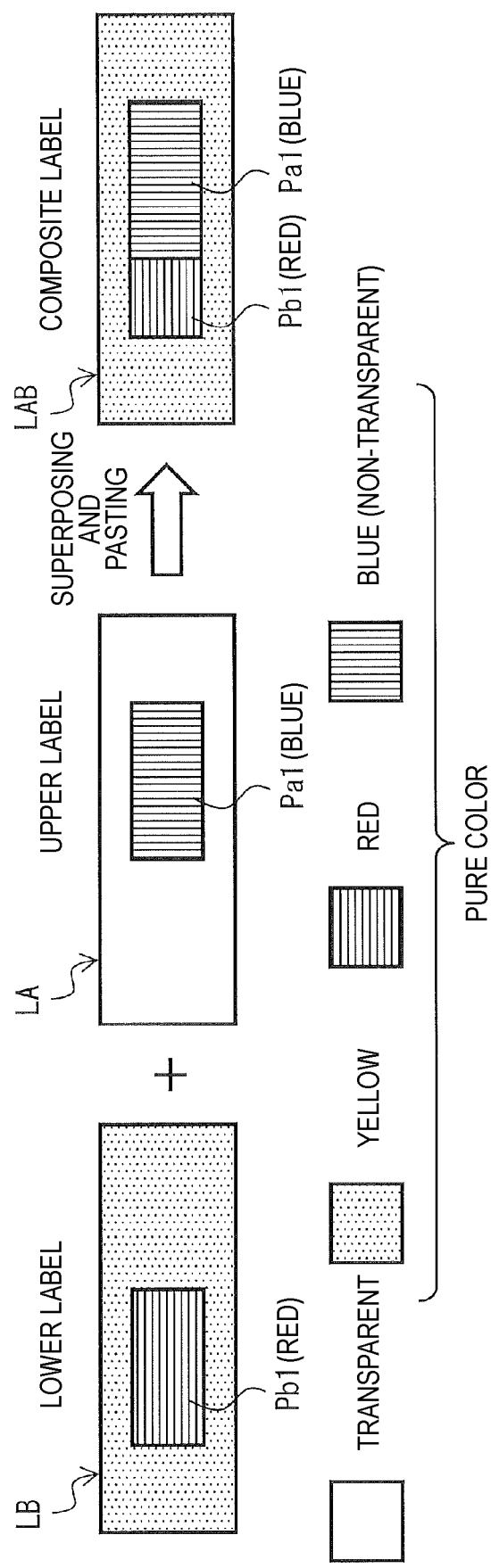

FIG. 8

COLOR SEPARATION TABLE

| MIXED COLOR | PURE COLOR 1 | PURE COLOR 2 |
|---|---|---|
| PURPLE | RED | BLUE |
| GREEN | YELLOW | BLUE |
| ORANGE | RED | YELLOW |
| ... | ... | ... |

FIG. 9

CARTRIDGE MANAGEMENT TABLE

| No. | CTG MODEL NUMBER | TAPE COLOR | PRINT COLOR | USER POSSESSION |
|---|---|---|---|---|
| 1 | CTG00001 | WHITE | BLACK | ☑ |
| 2 | CTG00002 | WHITE | RED | ☑ |
| 3 | CTG00003 | WHITE | BLUE | ☑ |
| 4 | CTG00004 | WHITE | YELLOW | ☐ |
| 5 | CTG00005 | WHITE | GREEN | ☑ |
| ... | ... | ... | ... | ... |

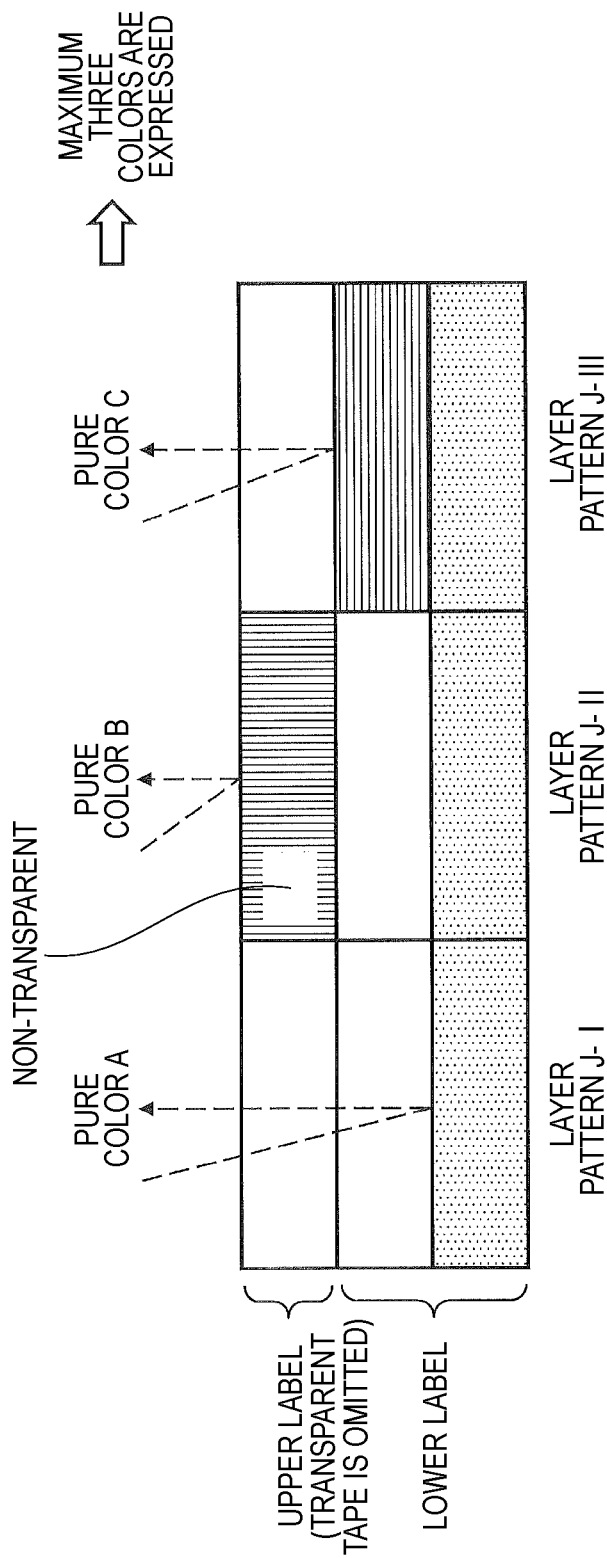

NON-TRANSITORY COMPUTER-READABLE STORAGE MEDIUM AND EDIT PROCESSING METHOD

CROSS-REFERENCE TO RELATED APPLICATION

This application is based upon and claims the benefit of priority from prior Japanese patent application No. 2020-180353, filed on Oct. 28, 2020, the entire contents of which are incorporated herein by reference.

TECHNICAL FIELD

The present invention relates to a technology of edit process executed by a terminal device connected to a printing device.

BACKGROUND

In the related art, for example, JP-A-2010-17937 discloses technology of preparing a plurality of print labels, which are used to be laid and pasted, by performing printing on each of different types of tapes for printing.

In the technology of the related art, when a cartridge is mounted on a printing device, desired printing is performed on a tape supplied from the cartridge and the tape after printing is then cut into a predetermined length, so that a print label is prepared.

In the technology of the related art, when preparing the plurality of print labels, it is possible to set a print color and a tape color on each print label as desired colors in advance on a screen of a terminal device. In addition, an appearance at a time when the plurality of print labels based on the settings is laid and pasted can be displayed on the screen of the terminal device, as a result of the color setting on each print label.

However, for example, there is a case where a user wants to first determine colors on the appearance of the plurality of print labels in a laid and pasted state and to prepare the print labels by sequentially using a plurality of appropriate cartridges so as to realize the appearance colors. The above technology of the related art does not consider these points. Therefore, it is difficult and inconvenient for the user to determine whether it is possible to realize the colors, which are determined as described above, on the appearance of the plurality of print labels in the laid and pasted state by using only the possessed types of cartridges, and if not possible, how can the appearance colors be changed for the realization.

SUMMARY

An object of the present invention is to provide a technology of edit process by which it is possible to easily know what kind of a medium storage body can realize a print label body having a user-desired appearance color.

A first aspect of the present disclosure is an non-transitory computer-readable storage medium storing an edit processing program, when executed by a controller of a terminal device that enables to be connected to a printing device including a mount unit on which a medium storage body accommodating a print medium is mounted and a print unit which performs desired printings with using different types of the print media, and configured to prepare a plurality of print labels in the printing device, which are laid and pasted in a thickness direction of the print labels to constitute a print label body, the edit processing program configured to cause the controller of the terminal device to perform:

a reception procedure of receiving a color-code setting for each of a plurality of regions provided on the print label body;

a determination procedure of determining a color setting on each of the plurality of print labels so as to realize a color-coding on the print label body corresponding to the color-code setting received in the reception procedure; and a display procedure of displaying, on a display unit of the terminal device, the color settings on the plurality of print labels determined in the determination procedure.

A second aspect of the present disclosure is an edit processing method performed by a terminal device, which enables to be connected to a printing device, on which a medium storage body accommodating a print medium is mounted, configured to perform desired printings with using different types of the print media, and configured to prepare a plurality of print labels in the printing device, which are laid and pasted in a thickness direction of the print labels to constitute a print label body, the edit processing method including the steps of:

receiving a color-code setting for each of a plurality of regions provided on the print label body;

determining a color setting on each of the plurality of print labels so as to realize a color-coding on the print label body corresponding to the received color-code setting; and displaying, on a display unit of the terminal device, the determined color setting on the plurality of print labels.

According to the first and second aspects, in a state where the edit processing program is executed on the terminal device, when the user performs the color-code setting on the plurality of desired regions, which the user desires to realize on the print label body, the setting is received in the reception procedure. In the subsequent determination procedure, the color setting on each print label for realizing the color-coding on the print label body corresponding to the received color-code setting is determined. Thereafter, the determined color settings are displayed on the display unit of the terminal device in the display procedure.

Thereby, the user can know at least one of combinations of appearance colors of each of the plurality of print labels, which can configure a final appearance color of the print label body desired by the user. As a result, the user can know what kind of medium storage body can realize the print label body having a desired appearance color, specifically, whether it is possible to realize the print label body having the appearance color only by the type of the possessed medium storage body, and if not possible, how can the appearance colors be changed for the realization only by the type of the possessed medium storage body, for example. As a result, the convenience for the user is improved.

According to the first and second aspects, it is possible to easily know what kind of medium storage body can realize the print label body having a user-desired appearance color.

BRIEF DESCRIPTION OF DRAWINGS

FIGS. 4A and 4B show an example in which two print labels where a print color of an upper label is non-transparent are laid to form one composite label.

FIG. 8 schematically shows an example of a color separation table.

FIG. 9 schematically shows an example of a cartridge management table.

FIGS. 14A and 14B show an example of color arrangement pattern separation when a color-code setting is realized by simple region division without mixing colors.

DETAILED DESCRIPTION

Hereinafter, an embodiment of the present invention will be described with reference to the drawings.

<Overall Configuration of System>

Figure 1:
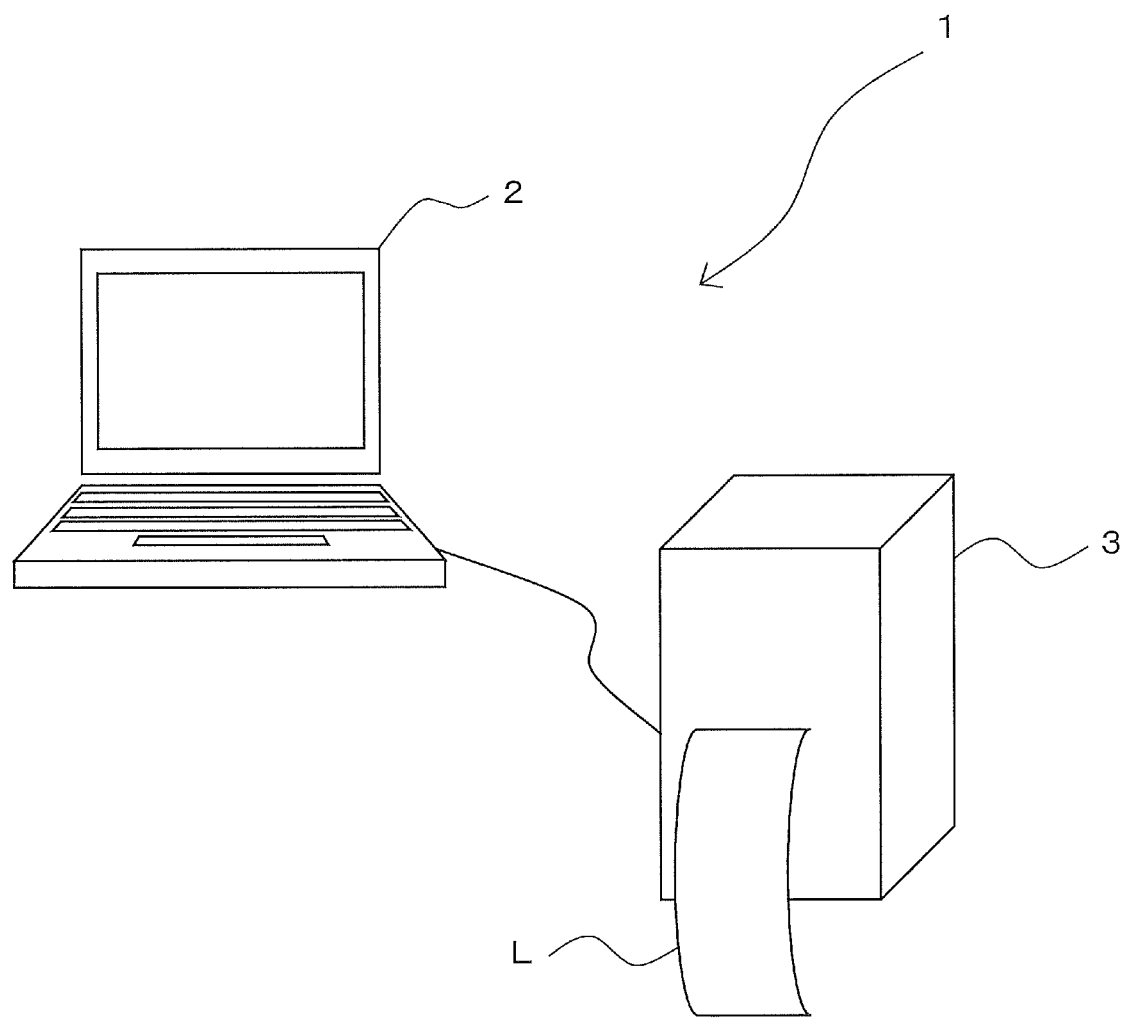
FIG. 1 is a system configuration view schematically showing an overall configuration of a printing system according to one embodiment of the present invention.

FIG. 1 shows an overall configuration of a printing system according to the present embodiment. In FIG. 1, a printing system 1 includes an operation terminal 2 constituted by a general-purpose personal computer, for example, and a label printer 3 connected to the operation terminal 2. The operation terminal 2 is connected to the label printer 3 so as to transmit and receive information each other. The label printer 3 is configured to prepare a print label L, based on a user's operation on the operation terminal 2. Note that, the label printer 3 is an example of the printing device, and the operation terminal 2 is an example of the terminal device.

<Operation Terminal>

Figure 2:
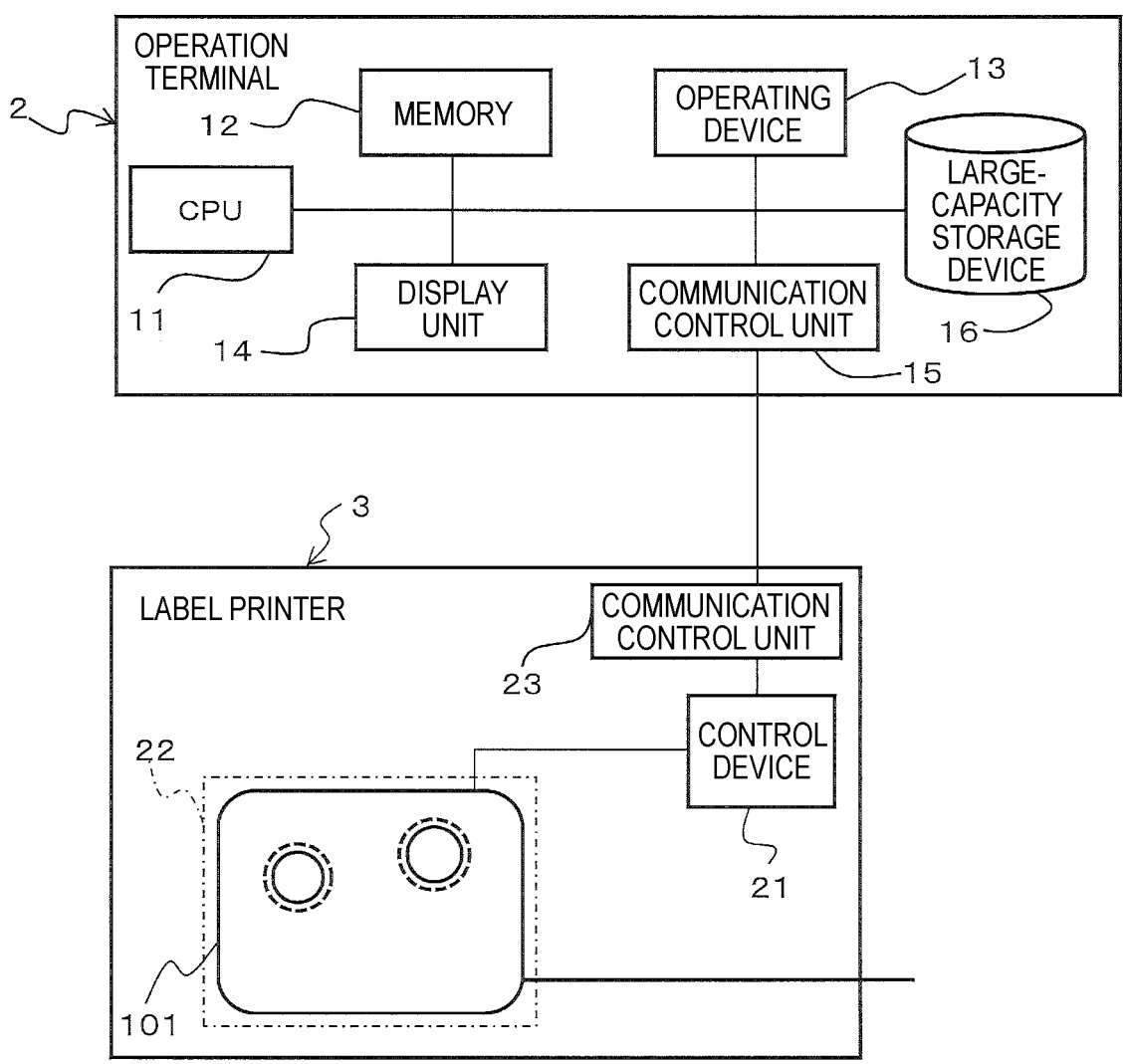
FIG. 2 is a functional block diagram showing functional configurations of an operation terminal and a label printer.

As shown in FIG. 2, the operation terminal 2 includes a CPU 11, a memory 12 constituted by a RAM, a ROM and the like, for example, an operating device 13, a display unit 14, a communication control unit 15, and a large-capacity storage device 16. Note that, the CPU 11 is an example of the controller.

The operating device 13 is constituted by a mouse, a keyboard and the like to which an instruction and information are input from a user. The display unit 14 is configured to display a variety of information and messages. The communication control unit 15 is configured to perform control on transmission and reception of signals with respect to the label printer 3. The large-capacity storage device 16 is configured to store a variety of programs and information. The CPU 11 is configured to perform various processing and transmission and reception of signals with respect to the label printer 3, according to programs stored in advance in the ROM and the large-capacity storage device 16, while using a temporary storing function of the RAM.

<Label Printer>

As shown in FIG. 2, the label printer 3 includes a control circuit 21, a cartridge holder 22 to which a cartridge 101 can be detachably mounted, and a communication control unit 23. The cartridge holder 22 is configured so that the cartridge 101 can be mounted and demounted. Note that, the cartridge 101 is an example of the medium storage body, and the cartridge holder 22 is an example of the mount unit. The control circuit 21 is connected to the communication control unit 15 of the operation terminal 2 via the communication control unit 23, so that the label printer 3 can transmit and receive information to and from the operation terminal 2.

<Cartridge and Cartridge Holder>

Figure 3:
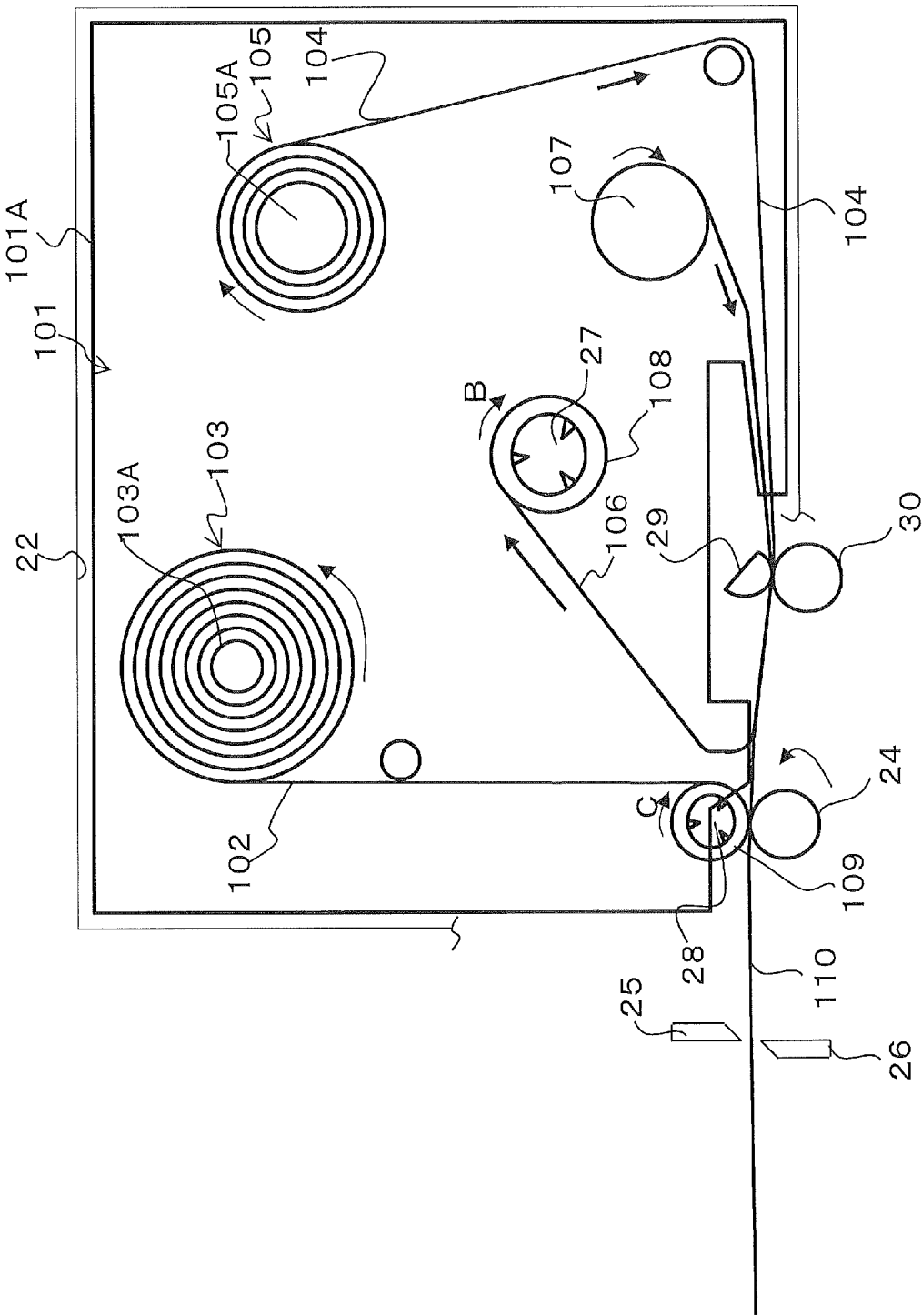
FIG. 3 is a schematic view showing an internal configuration of a cartridge.

FIG. 3 shows detailed structures of the cartridge 101 and the vicinity of the cartridge holder 22. The cartridge 101 has a housing 101A, a first roll 103 arranged in the housing 101A and having a strip-shaped base material tape 102 wound thereon, a second roll 105 on which a transparent cover film 104 having the same width as the base material tape 102 is wound, a ribbon supply-side roll 107 configured to reel out an ink ribbon 106, a ribbon winding roller 108 configured to wind the ink ribbon 106 after printing, and a tape conveying roller 109 rotatably supported in the vicinity of a tape discharge part of the cartridge 101. Note that, the integration of the cover film 104, the base material tape 102 and the ink ribbon 106 is an example of the print medium, and the base material tape 102 is an example of the printed tape. In a case where the cover film 104 is a heat-sensitive tape that can develop a predetermined color by receiving heat, the ink ribbon 106 is unnecessary. Note that, the first roll 103 and the second roll 106 each have a spiral shape but are each simply shown as a concentric circle shape in FIG. 3.

The first roll 103 has a reel member 103A around which the base material tape 102 is wound. The base material tape 102 has such a configuration that an adhesive layer for adhesion, a base material layer, an adhesive layer for pasting and a release material layer are stacked in corresponding order from an inner side of the first roll 103, on which the base material tape is wound, toward an opposite side. The second roll 105 has a reel member 105A around which the cover film 104 is wound. The tape conveying roller 109 is configured to convey the tape while pressurizing and bonding the base material tape 102 and the cover film 104 to form a tape 110 for print label.

The cartridge holder 22 is provided with a ribbon winding roller drive shaft 27 for winding the used ink ribbon 106 in the cartridge 101, and a tape conveying roller drive shaft 28 for conveying the tape 110 for print label. The ribbon winding roller 108 and the tape conveying roller 109 are configured to rotatively drive in conjunction with each other as a drive force of a motor (not shown) for conveying roller is transmitted to the ribbon winding roller drive shaft 27 and the tape conveying roller drive shaft 28. The cartridge holder 22 is also provided with a print head 29 configured to form a desired print on the cover film 104 being conveyed. Note that, the print head 29 is an example of the print unit.

A fixed blade 25 and a movable blade 26 configured to cooperate with the fixed blade 25 to cut the tape 110 for print label in a thickness direction are provided downstream of the tape conveying roller 109 and a pressing roller 24 along a conveying path of the tape 110 for print label.

<Outline of Operations of Label Printer>

In the label printer 3 configured as described above, when the cartridge 101 is mounted to the cartridge holder 22, the cover film 104 and the ink ribbon 106 are sandwiched between the print head 29 and a platen roller 30 facing the print head 29. The base material tape 102 and the cover film 104 are sandwiched between the tape conveying roller 109 and the pressing roller 24 facing the tape conveying roller 109. The rotary winding roller 108 and the tape conveying roller 109 are rotatively driven in synchronization with each other in directions shown with an arrow B and an arrow C in FIG. 3, so that the pressing roller 24 and the platen roller 30 are rotated. The base material tape 102 is reeled out from the first roll 103 and is supplied to the tape conveying roller 109. The cover film 104 is reeled out from the second roll 105 and a plurality of heat generating elements of the print head 29 is electrified by a print drive circuit (not shown), so that printing is performed on the cover film 104. The ink ribbon 106 on which printing on the cover film 104 is completed is wound onto the ribbon winding roller 108 by drive of the ribbon winding roller drive shaft 27.

The base material tape 102 and the cover film 104 on which the printing is over are bonded and integrated by the tape conveying roller 109 and the pressing roller 24, so that the tape 110 for print label is formed and is taken out to an outside of the cartridge 101. The tape 110 for print label taken out to the outside of the cartridge 101 is cut by cooperation of the fixed blade 25 and the movable blade 26, so that a print label L is obtained.

<Composite Label and Color Arrangement Pattern>

In the present embodiment, the two print labels L and L prepared by the label printer 3 according to a predetermined print condition are overlaid and bonded, and are pasted to a pasting target in the bonded state. A difference in color expression based on the print label L and the print condition is described with reference to examples shown in FIGS. 4A to 6.

Figure 4B:
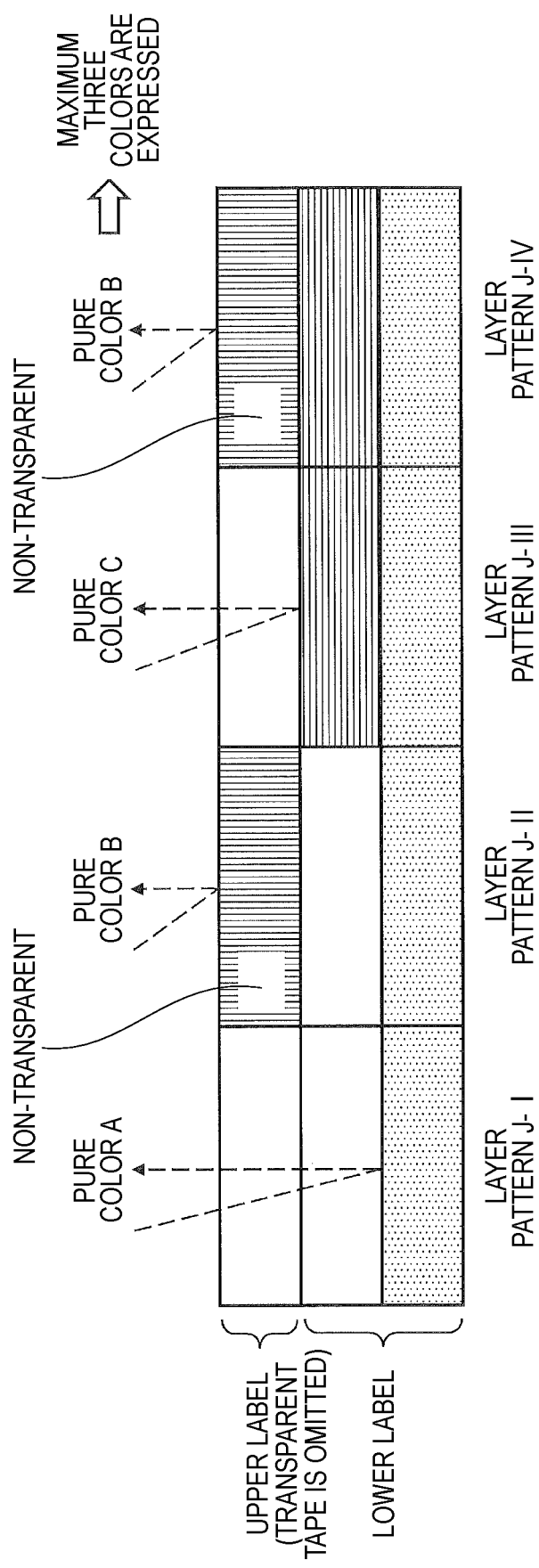

FIGS. 4A and 4B show a case where a print color of an upper label is non-transparent as a print condition. FIG. 4A shows a print example of each of an upper label and a lower label, and a color arrangement pattern on a composite label where the two print labels are laid and pasted. FIG. 4B shows all layer patterns of tape colors and print colors, as seen from a section of the composite label taken along a thickness direction.

A lower label LB shown at the left of FIG. 4A is a print label L that is pasted to a backside, i.e., a lower side of an upper label LA (which will be described later) when superposing and pasting the labels. As described later, for the lower label LB, the base material tape 102 having a tape color automatically selected from various types of colors including even transparency is used, and the cover film 104 on which a predetermined print pattern is formed by a print color separately automatically selected is bonded to a surface of the lower label. In the shown example of the lower label LB, the cover film 104 on which a rectangular print pattern Pb1 is formed at a left position in FIG. 4A by a print color of red is bonded to a surface of the base material tape 102 having a tape color of yellow.

An upper label LA shown at the center of FIG. 4A is a print label L that is pasted to a surface-side, i.e., an upper side of the lower label LB when superposing and pasting the labels. As described later, for the upper label LA, the base material tape 102 having a transparent tape color is necessarily used, and the cover film 104 on which a predetermined print pattern is formed by a print color automatically selected is bonded to a surface of the upper label. In the shown example of the upper label LA, the cover film 104 on which a rectangular print pattern Pa1 is formed at a right position in FIG. 4A by a print color of blue is bonded to a surface of the base material tape 102 having a transparent tape color.

Here, in the example of the present invention, it is assumed that the print color of a print formed on the cover film 104 with using any type of the ink ribbon 106 can be switched as to presence or absence of transparency of enabling transmission of light by any electrification control or the like in the print head 29. However, the tape color of the base material tape 102 cannot be switched as to presence or absence of transparency.

The number of the print labels L laid and pasted and the presence or absence of transparency of each print color of each print label L are set as any print condition in advance by the user. In the examples shown in FIGS. 4A to 6, it is commonly premised that the two print labels LA and LB are laid and pasted. For easy understanding of the description, in common with FIGS. 4A to 5B, the tape color of the lower label LB is colored instead of transparent, and the print color of the lower label LB is printed non-transparent, and particularly in the example of FIGS. 4A and 4B, the print condition is such that the print color of the upper label LA is also printed non-transparent.

When the lower label LB and the upper label LA of FIG. 4A, on which the print colors are each printed with such print condition, are laid and pasted, a composite label LAB having a color expression of a color arrangement pattern shown at the right of FIG. 4A is prepared. In the composite label LAB, a left half of the rectangular print pattern Pa of the upper label LA directly overlaps with the rectangular print pattern Pb1 of the lower label LB, and the remaining right half overlaps the base material tape 102 of the lower label LB. Since the print condition is such that the print color of the upper label LA is non-transparent, as described above, the rectangular print pattern Pa1 of the upper label LA located on the outermost surface-side appears in blue, which is the original print color, as a whole. The rectangular print pattern Pb1 of the lower label LB appears in red, which is the print color, at a part that does not overlap with the rectangular print pattern Pa1 of the upper label LA. The base material tape 102 of the lower label LB appears in yellow, which is the tape color, at a part that does not overlap with any of the rectangular print patterns Pa1 and Pb1 of the upper label LA and the lower label LB. Note that, the composite label LAB is an example of the print label body.

According to the print condition in which the print colors of both the lower label LB and the upper label LA are uniformly set non-transparent, layer patterns of all colors that can be achieved with the composite label LAB are four types shown in FIG. 4B. Each layer pattern shown in FIG. 4B shows a combination of orders of laying colors as seen in a section of the composite label LAB taken along a thickness direction, and the tape color of the lower label LB, the print color of the lower label LB and the print color of the upper label LA are shown side by side in ascending order from the lower side. Due to the configuration of the cartridge 101 shown in FIG. 3, the tape color of the lower label LB is always present in the same color, and the print color of the lower label LB and the print color of the upper label LA are each the same color and the presence or absence of print is switched. Note that, for simple illustration, the base material tape 102 of the upper label LA, which has the transparent tape color, is not shown. Note that, the distinction between the lower label LB and the upper label LA indicated by the layer patterns is an example of the order of laying the plurality of print labels.

A layer pattern J-I corresponds to a region in which any of the prints on each of the upper label LA and the lower label LB does not overlap with the surface of the base material tape 102 of the lower label LB. In the region corresponding to the layer pattern J-I, the tape color of the base material tape 102 of the lower label LB appears as a pure color A, as it is.

An layer pattern J-II corresponds to a region in which only the print of the upper label LA overlaps with the surface of the base material tape 102 of the lower label LB. In the region corresponding to the layer pattern J-II, the print color of the upper label LA appears as a pure color B, as it is.

An layer pattern J-Ill corresponds to a region in which only the print of the lower label LB overlaps with the surface of the base material tape 102 of the lower label LB. In the region corresponding to the layer pattern J-III, the print color of the lower label LB appears as a pure color C, as it is.

An layer pattern J-IV corresponds to a region in which both the print of the upper label LA and the print of the lower label LB overlap with the surface of the base material tape 102 of the lower label LB. In the region corresponding to the layer pattern J-IV, the print color of the upper label LA appears as the pure color B, as it is, like the layer pattern J-II.

As described above, according to the print condition in which the print colors of both the lower label LB and the upper label LA are uniformly set non-transparent, the maximum number of colors that can be expressed on the composite label LAB is three colors of the pure colors A, B and C.

Subsequently, a print condition in which the print color of the lower label LB is uniformly set non-transparent and the print color of the upper label LA is uniformly set transparent is described with reference to FIGS. 5A and 5B.

Figure 5A:
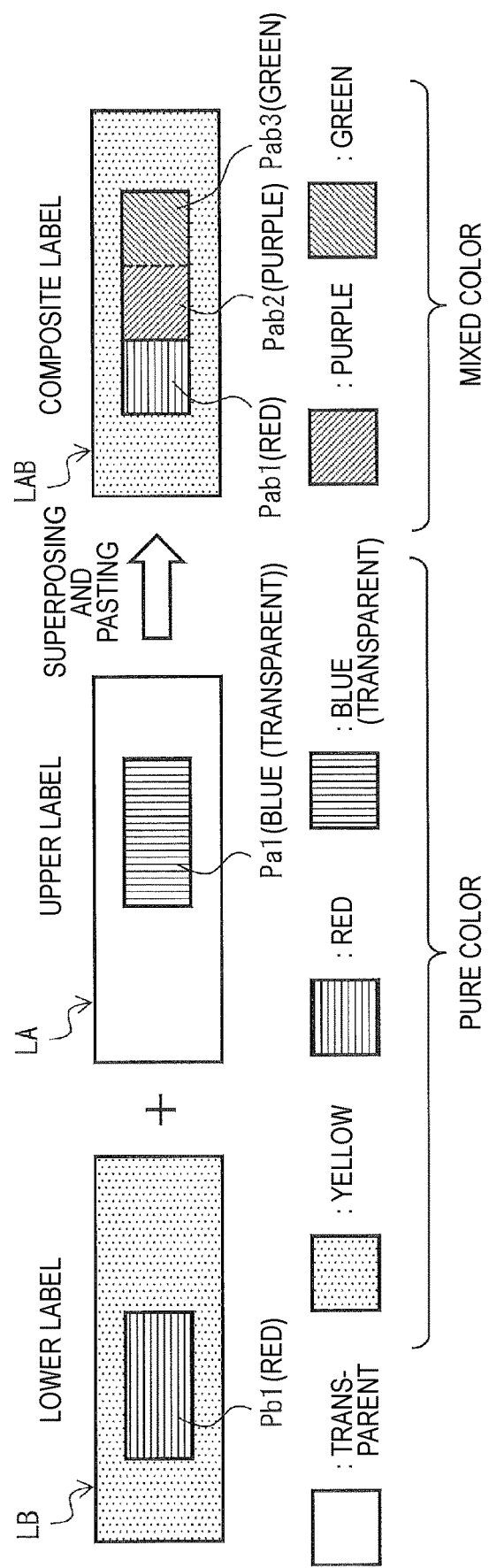
FIGS. 5A and 5B show an example in which two print labels where the print color of the upper label is transparent are laid to form one composite label.

FIG. 5A corresponds to FIG. 4A and the tape color, the print color and the print pattern of each of the lower label LB and the upper label LA are all made by the same setting. However, FIG. 5A is different from FIG. 4A, in that only the print color of the upper label LA is transparent in FIG. 5A. For this reason, a color expression of the color arrangement pattern of the composite label LAB where the two print labels LA and LB are laid and pasted is different from FIG. 4A. Specifically, in a region, which does not overlap with the rectangular print pattern Pa1 of the lower label LA, of the rectangular print pattern Pb1 of the lower label LB, the print color appears as the red rectangle Pab1, as it is, on the composite label LAB. In addition, in a region, which overlaps with the rectangular print pattern Pb1 of the lower label LB, of the rectangular print pattern Pa1 of the upper label LA, the print color appears as a purple rectangle Pab2 in which red and blue are mixed, on the composite label LAB. In addition, in a region, which directly overlaps with the base material tape 102 of the lower label LB, of the rectangular print pattern Pa1 of the upper label LA, the print color appears as a green rectangle Pab3 in which yellow and blue are mixed, on the composite label LAB.

Figure 5B:
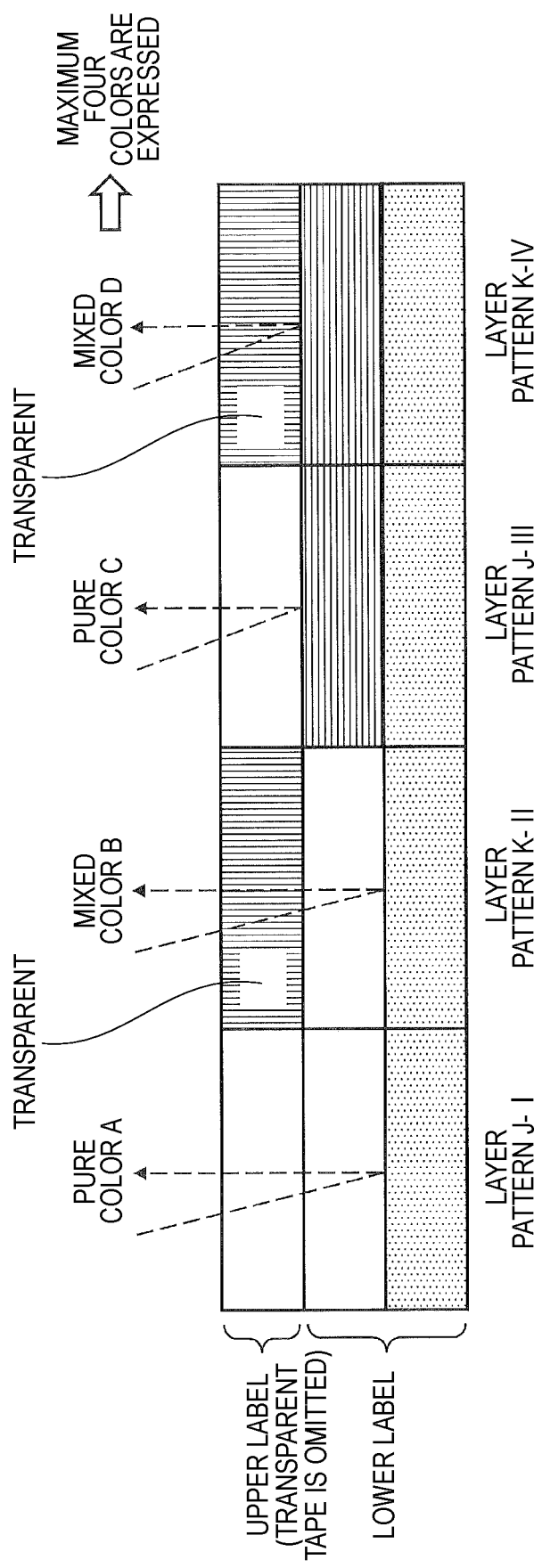
Figure 6:
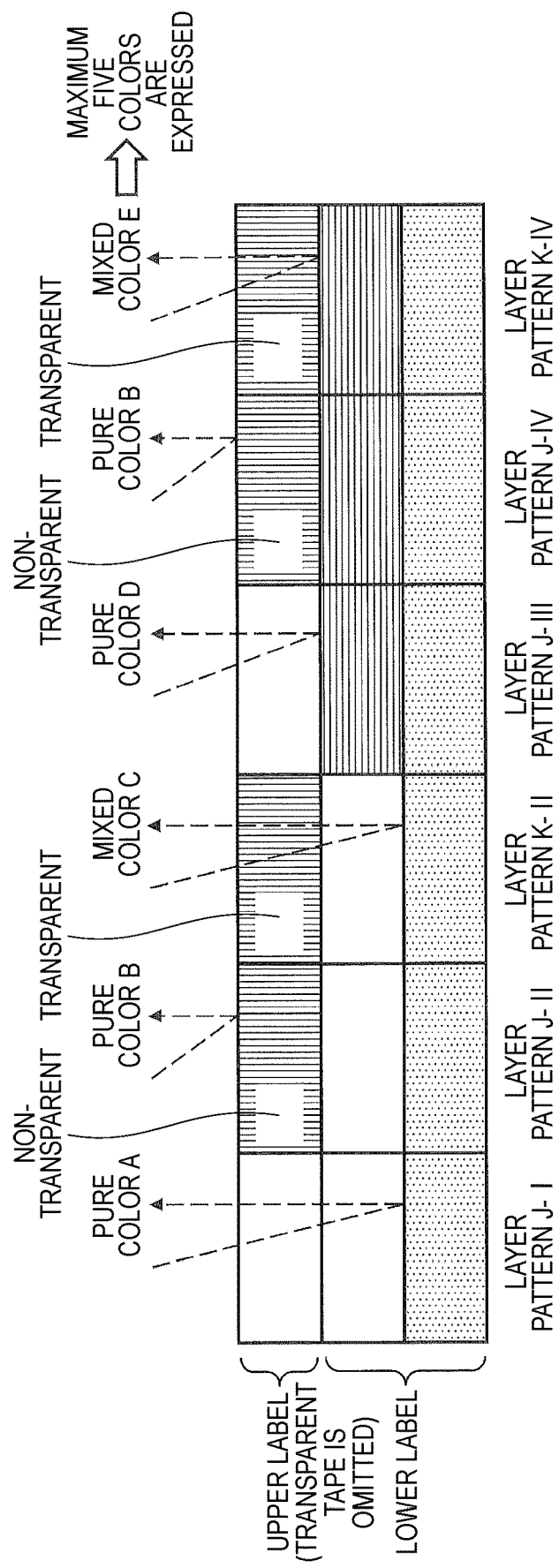
FIG. 6 shows an example of a layer pattern when the print color of the upper label can be switched in transparency.

Specifically, as shown with layer patterns in FIG. 5B, in the layer patterns J-I and J-III where the print of the upper label LA does not overlap, the print colors appear as the corresponding pure colors A and C, respectively, like FIG. 4B. However, in a layer pattern K-II where the print of the upper label LA directly overlaps with the base material tape 102 of the lower label LB, the print color appears as a mixed color B where the print color and the tape color are mixed. In addition, in a layer pattern K-IV where the print of the upper label LA directly overlaps with the print of the lower label LB, the print color appears as a mixed color D in which the two print colors are mixed. In this way, according to the print condition in which the print color of the lower label LB is uniformly set non-transparent and the print color of the upper label LA is uniformly set transparent, the maximum number of colors that can be expressed on the composite label LAB is four colors of the pure colors A and C and the mixed colors B and D.

That is, the maximum number of colors to be expressed on the composite label LAB changes depending on the contents of the print conditions. Note that, in a case where the switching control on the transparency can be performed in a dot unit of the print that is formed on the cover film 104 by the print head 29, the maximum number of colors to be expressed further increases. For example, in a case of the print condition in which the print color of the lower label LB is uniformly set non-transparent and the print color of the upper label LA can be switched as to presence or absence of transparency, like layer patterns shown in FIG. 6, the maximum number of colors to be expressed is a total of five colors, including two mixed colors C and E shown in layer patterns K-II and K-IV, in addition to the three colors of pure colors A, B and D shown in layer patterns J-I, J-II, J-III and J-IV.

Note that, although not specifically shown, the more maximum number of colors to be expressed is obtained with other print conditions such as a condition in which the print color of the lower label LB is also set transparent and a condition in which three or more print labels L are laid and pasted. However, only the lowest lower label LB has the base material tape 102 whose tape color is colored other than transparent, and the mixed color of N or more colors is limited to a layer pattern where (N−1) print colors on the surface-side are all transparent. In addition, although not specifically shown, when the tape color of the lower label LB is also set transparent, the maximum number of colors to be expressed decreases.

Features of Embodiment

In the present embodiment having the above configuration, the feature is processing that, in a case where the user sets the print condition and the color arrangement pattern on the composite label LAB, is performed when automatically setting the tape color, the print color and the print pattern of each print label L capable of realizing the color arrangement pattern while satisfying the print condition. This is described in detail according to procedures, as follows.

<Color Arrangement Pattern Separation from Composite Label>

As described above, when the print condition of the print label L is set in advance, the maximum number of colors to be expressed on the composite label LAB can be accordingly determined. On the other hand, when the color-code setting of the color arrangement pattern on the composite label LAB is made with the number of colors equal to or smaller than the maximum number of colors to be expressed, the tape color, the print color and the print pattern of each print label L capable of realizing the color arrangement pattern on the composite label LAB while satisfying the corresponding print condition can be automatically set. Hereinafter, such various setting processing for each print label L is referred to as color arrangement pattern separation.

Figure 7:
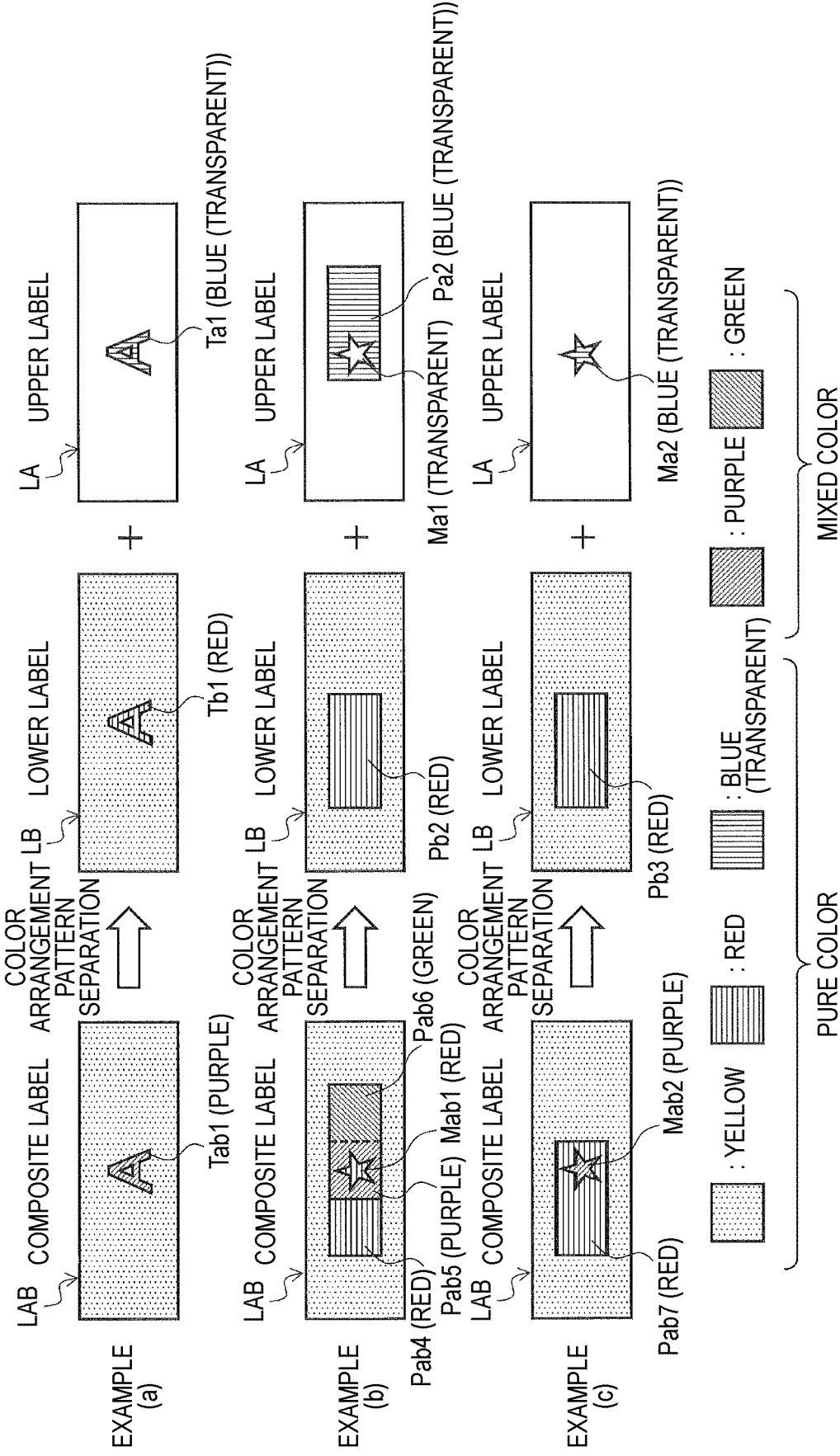
FIG. 7 shows an example of color arrangement pattern separation when the print color of the upper label is transparent.

For example, in a case where one composite label LAB is prepared by superposing and pasting two print labels LA and LB and the print condition is such that the tape color of the lower label LB is colored and only the print color of the upper label LA is uniformly set transparent, the color arrangement pattern separations as shown in FIG. 7 are possible.

The example (a) in FIG. 7 shows a color arrangement pattern on the composite label LAB where a print text Tab1

'A' with the print color of purple is formed on the tape color of yellow. In this case, the color arrangement pattern can be separated into the lower label LB where the tape color is yellow and a print text Tab1 'A' is formed with the print color of red and the upper label LA where the same print text Ta1 'A' is formed with the print color of transparent blue. Note that, in this case, the color arrangement pattern can also be separated into the lower label LB where the print color is blue and the upper label LA where the print color is transparent red (not shown).

The example (b) in FIG. 7 shows a color arrangement pattern on the composite label LAB where a red rectangle Pab4, a purple rectangle Pab5 and a green rectangle Pab6 are closely formed side by side in corresponding order from the left on the tape color of yellow and a red star-shaped mark Mab1 is formed in the purple rectangle Pab5. In this case, the color arrangement pattern can be separated into the lower label LB where the tape color is yellow and a rectangle Pb2 is formed with the print color of red over both regions of the red rectangle Pab4 and the purple rectangle Pab5 and the upper label LA where a rectangle Pa2 is formed with the print color of transparent blue over both regions of the purple rectangle Pab5 and the green rectangle Pab6 and a print is removed in a shape of a star-shaped mark Ma1 in which only the region of the star-shaped mark Mab1 is transparent.

The example (c) in FIG. 7 shows a color arrangement pattern on the composite label LAB where a red rectangle Pab7 is formed on the tape color of yellow and a purple star-shaped mark Mab2 is formed in the red rectangle Pab7. In this case, the color arrangement pattern can be separated into the lower label LB where the tape color is yellow and a rectangle Pb3 is formed with the print color of red and the upper label LA where the star-shaped mark Ma2 is formed with the print color of transparent blue.

In order to execute processing of the color arrangement pattern separation as described above, a color separation table as shown in FIG. 8 and a cartridge management table as shown in FIG. 9 are necessary. The color separation table of the example shown in FIG. 8 is a table in which combinations of two pure colors separated from each of various color types of mixed colors with each of the mixed colors are recorded, and is recorded in advance in the large-capacity storage device 16 and the like of the operation terminal 2. Note that, in this case, the color types of the pure colors are all color types of the ink ribbons 106 provided for all the cartridges 101 available in the market. In other words, the color types of the mixed colors recorded in the color separation table are color types of all mixed colors that can be reproduced by combinations of color types of the variety of two types of ink ribbons 106 except combinations of the same colors. Basically, it is assumed that a pure color 1 and a pure color 2 are compatible, i.e., any one is transparent and is laid on the other to obtain the same mixed color. In addition, the example shown in FIG. 8 shows contents corresponding to only mixed colors of two pure colors. Note that, the color separation table is an example of the mixed color correlation, one of the pure color 1 and the pure color 2 is an example of one color type, the other is an example of another color type, and the mixed color is an example of the color type obtained as a result of mixing two color types.

The cartridge management table shown in FIG. 9 is a table in which combinations of the tape color of the base material tape 102 and the print color of the ink ribbon 106 provided for each of model numbers of all types of the cartridges 101 available in the market are recorded, and is recorded in advance in the large-capacity storage device 16 and the like of the operation terminal 2. In addition, in the shown example, user-retention information indicating whether the user has the cartridge 101 of the model number at that time point is recorded in correspondence to each model number. The recording of the user-retention information is sequentially updated by the user. Note that, the user-retention information in the cartridge management table may also be stored in association with user identification information such as a user ID. Alternatively, the user-retention information may also be stored in association with individual identification information of the label printer 3 such as a printer ID. In this case, the user-retention information associated with the user ID or printer ID separately input in advance is referred to.

In the printing system 1 of the present embodiment, the user first operates the operation terminal 2 to set the print condition and the color arrangement pattern on the composite label LAB. Then, the operation terminal 2 refers to the color separation table and the cartridge management table to execute the processing of the color arrangement pattern separation, thereby automatically setting the tape color, the print color and the print pattern of each of the print labels LA and LB capable of realizing the set color arrangement pattern while satisfying the print condition.

Specifically, the operation terminal extracts all the layer patterns J-I to J-IV, K-II and K-IV that can be applied based on the set print condition, and if a mixed color is set, also extracts combinations of all pure colors that can be applied to each of the mixed colors by referring to the color separation table. Then, the operation terminal searches the cartridge management table for a combination of the model numbers of the two cartridges 101 that satisfy the extracted layer patterns and the extracted combinations of pure colors in all the color arrangement regions. The search may be performed to extract the combination of round robins of the model numbers of the two cartridges 101.

<Edit Operation on Composite Label>

Figure 10:
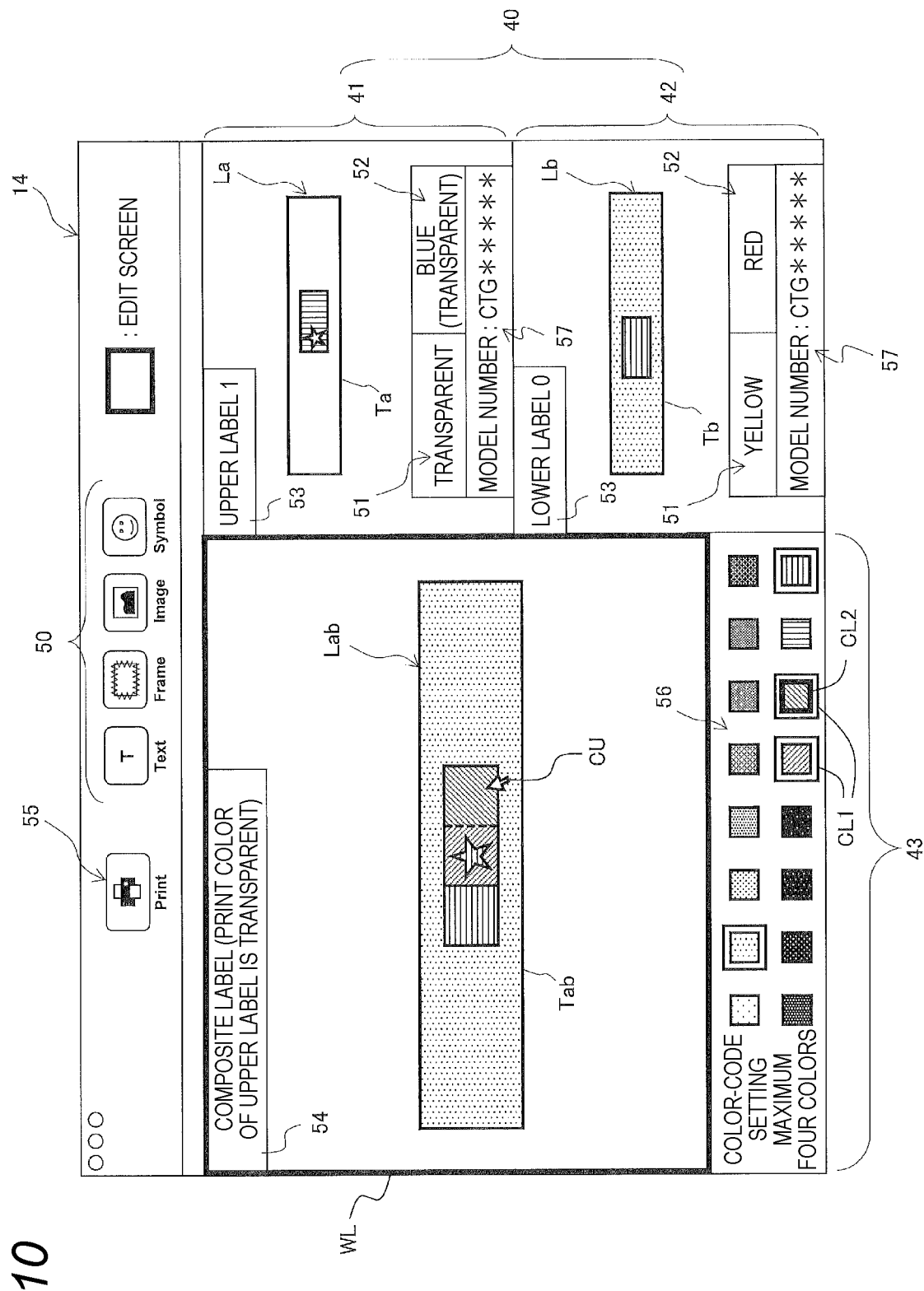
FIG. 10 shows a display example for editing-operating a color arrangement pattern of a composite label on a display unit of the operation terminal.

FIG. 10 shows a display example for editing-operating a color arrangement pattern on the composite label LAB on the display unit 14 of the operation terminal 2. Note that, in the example shown in FIG. 10, it is premised that the two print labels LA and LB are laid and pasted to prepare one composite label LAB and the print condition in which the tape color of the lower label LB is colored and only the print color of the upper label LA is uniformly set transparent is set. As shown in FIG. 10, the display unit 14 includes an edit monitor 43 capable of editing and setting a color arrangement pattern on the composite label LAB and a layer monitor 40 configured to display each of the two print labels LA and LB constituting the composite label LAB. In this example, the layer monitor 40 has a first layer monitor 41 corresponding to the upper label LA and a second layer monitor 42 corresponding to the lower label LB.

The edit monitor 43 is displayed with being surrounded by a thick frame border WL, which indicates an edit screen on which an edit operation can be performed, and edit operations such as deletion and addition of a print object and color-code setting of the print color and the tape color, which will be described later, can be performed thereon. At a corner portion on a left upper side of the edit monitor 43, a tab 54 on which 'composite label', which is a displayed target, and 'upper label print color is transparent', which is a content of the print condition, are described is displayed. At a lower part of the edit monitor 43, a message, which indicates the maximum number of colors to be expressed determined based on the print condition, and a color palette 56 are displayed. In this example, the maximum number of colors to be expressed is four colors, and 'maximum 4 colors of the color-code setting' is displayed. In the color palette 56, all pure colors and mixed colors that can be expressed are displayed in parallel with being each surrounded by a square frame.

When editing a color arrangement pattern on the composite label LAB, the user appropriately operates operation buttons 50 on the display unit 14 to arrange a variety of print objects in a tape image Tab indicative of the composite label LAB, in the edit monitor 43. In the shown example, the print object shown in the example (b) in FIG. 7 is arranged. Thereby, regions in which it is possible to perform the color-code setting of the base material tape 102 and each print object are set in the tape image Tab of the composite label LAB, so that the user performs a color-code setting operation as to which color type is used for expression for each region.

In the color-code setting operation, an operation of designating the color palette 56 of a color type to be applied and an operation of designating a region to which the designated color type is applied are continuously performed by a user's operation on a cursor CU via the operating device 13, for example. At this time, the designated color palette 56 is displayed surrounded by a large line frame CL1, and the designated region in the tape image Tab is displayed by the designated color type. Note that, the number of the color palettes 56 that can be designated and operated has an upper limit that is the maximum number of colors to be expressed, and the color palette 56 already designated in the past is displayed surrounded by a small thick line frame CL2. In particular, when the past designation of the color palette 56 is deleted or changed by an appropriate operation (not shown), the corresponding display of the color type of the region in the tape image Tab is also deleted or changed. By the above edit operation in the edit monitor 43, the color arrangement pattern on the composite label LAB is edited.

In addition, at corner portions on left upper sides in the first layer monitor 41 and the second layer monitor 42, tabs 53 on which distinctions between the corresponding print labels LA and LB, i.e., in the shown example, 'upper label 1' and 'lower label 0' are each described are displayed. Note that, the shown example shows a case where the upper label LA laid and pasted over the lower label LB is only one. However, in a case where a plurality of upper labels LA is laid and pasted over the lower label LB, three or more layer monitors may be switched and displayed by a scroll display or the like, for example (which is not separately shown). For this reason, in the display example on the tabs 53, the lower label LB is particularly indicated as 'lower label 0', and the upper label LA is indicated as 'upper label 1'. In a case of superposing and pasting a plurality of upper labels LA, other layer monitors in which the tabs 53 such as 'upper label 2', 'upper label 3' and the like are displayed are sequentially switched and displayed. Note that, in each of the layer monitors 41 and 42, the thick frame border WL is not displayed and the corresponding tape images Ta and Tb are each displayed. However, an edit operation of directly correcting or resetting the tape images cannot be performed. In each of the layer monitors 41 and 42, each time the color arrangement pattern on the composite label LAB in the edit monitor 42 is changed, displays of print patterns Pb2, Pa2 and Mb1 in the corresponding tape images Ta and Tb are automatically switched according to the processing of the color arrangement pattern separation.

In addition, in the present embodiment, at a lower part of each of the layer monitors 41 and 42, a tape color display portion 51, a print color display portion 52 and a cartridge model number display portion 57 are provided. By the print condition of this example, in the first layer monitor 41 corresponding to the upper label LA, the tape color display portion 51 fixedly displays 'transparency', and the portion of the base material tape 102 in the tape image Ta is accordingly displayed in a color corresponding to transparency, for example, a color without a background color in the screen. As for the color setting in each of the print color display portion 52 of the first layer monitor 41 and the tape color display portion 51 and the print color display portion 52 of the second layer monitor 42, the display of the color type is automatically switched each time the color arrangement pattern on the composite label LAB in the edit monitor 43 is changed. At this time, in the print color display portion 52 of the first layer monitor 41, '(transparency)' is also displayed according to the print condition. Further, also in the cartridge model number display portion 57 of each of the layer monitors 41 and 42, the display of the model number is automatically switched each time the color arrangement pattern of the composite label LAB in the edit monitor 43 is changed.

Note that, as shown as the example (a) in FIG. 7, in the case where the color arrangement pattern can be separated with the color settings and the layer patterns of the plurality of combinations, each of the layer monitors 41 and 42 corresponding to each of the combinations may be switched and displayed by a scroll display or the like, for example (which is not separately shown). In this case, in the indication examples of the tabs 53 and 54, the lower label LB may be indicated as 'lower label 1-0', and the corresponding upper label LA may be indicated as 'upper label 1-1'. In other combinations, 'lower label 2-0' and 'upper label 2-1' may be indicated, for example.

When the user pushes a print button 55 via the operating device 13, the edit operation is over and print data corresponding to each of the print labels LA and LB is generated.

<Display of Model Numbers of Cartridges that are Used>

Figure 11:
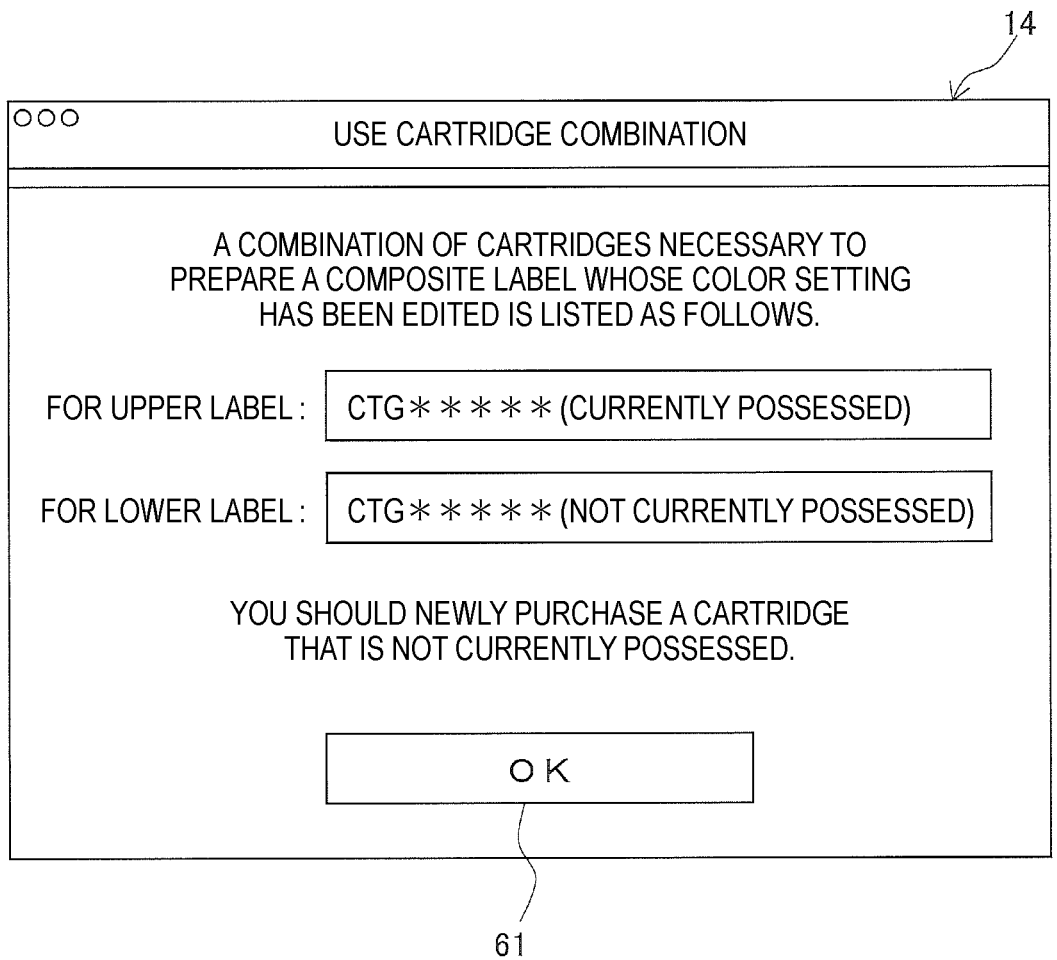
FIG. 11 shows an example of a display screen of a use cartridge combination when there is only one combination of cartridges to be used.
Figure 12:
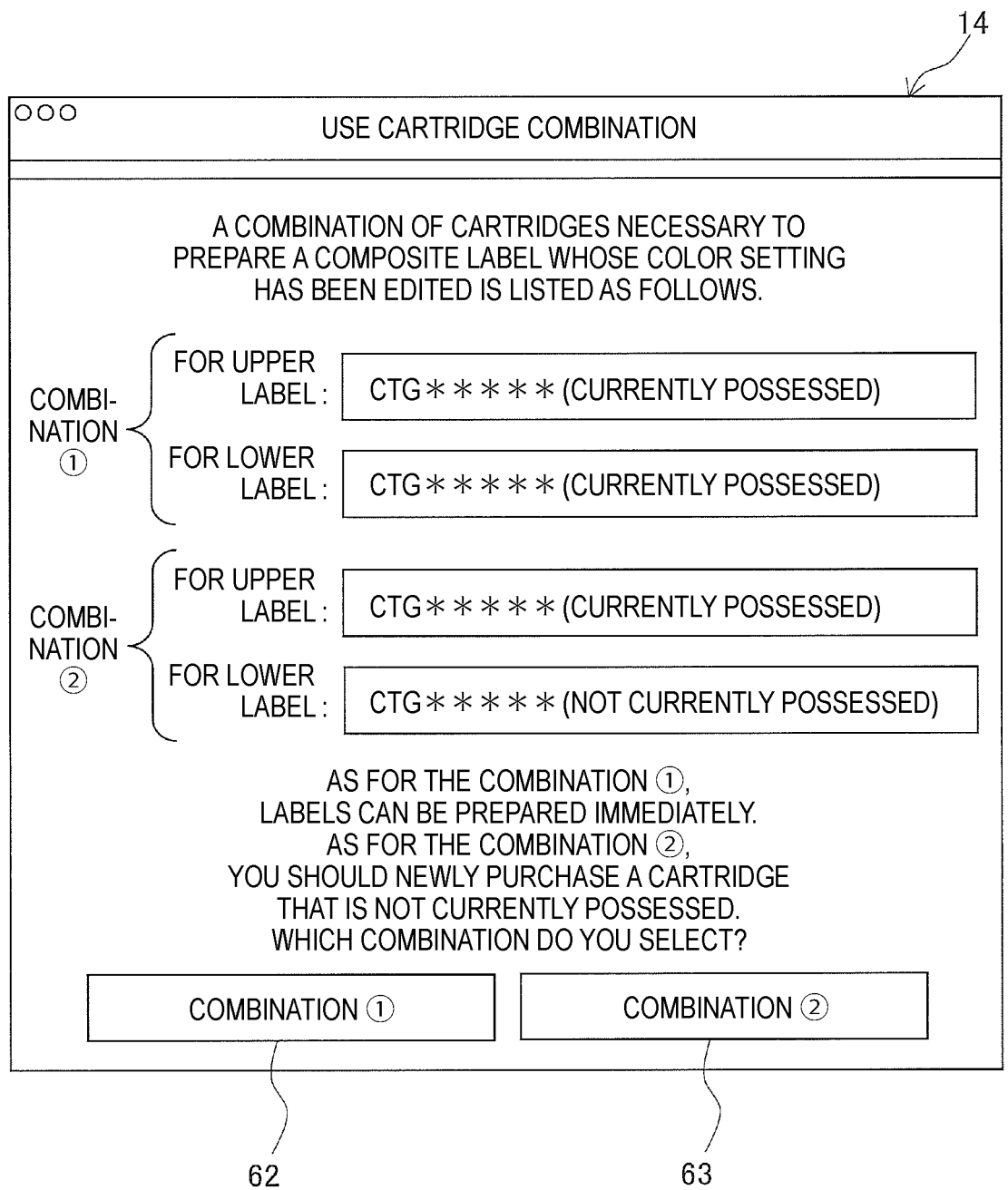
FIG. 12 shows an example of the display screen of the use cartridge combination when there are two combinations of cartridges to be used.

When the edit operation is over, a display screen of a use cartridge combination shown in FIG. 11 or 12 is displayed on the display unit 14, for example. FIG. 11 shows a display screen when there is only one combination of the two cartridges 101 that are used for printing on each of the upper label LA and the lower label LB, like the color arrangement pattern separation shown as the example (b) in FIG. 7. In FIG. 11, only one set of the model numbers of the two cartridges 101 that are each used for the upper label LA and the lower label LB is displayed. At this time, based on the recorded contents of the user-retention information in the cartridge management table, information indicating whether the user currently has the cartridge 101 of each model number is also displayed associated. In a case where the user does not have any one cartridge 101, a message indicating that it is necessary to newly purchase a cartridge is displayed, as shown, and the processing stands by until a push operation is performed on an OK button 61. When a push operation is performed on the OK button 61, appropriate processing of transmitting the print data generated in correspondence to each of the print labels LA and LB to the label printer 3 is performed, for example.

In addition, in a case where there are two or more combinations of the two cartridges 101 that are used for printing on each of the upper label LA and the lower label LB, like the color arrangement pattern separation shown as the example (a) in FIG. 7, a display screen of FIG. 0.12 is displayed on the display unit 14. In the example of FIG. 12, two sets are displayed as the combinations of the model numbers of the two cartridges 101 that are used for each of the upper label LA and the lower label LB. For a combination that the user currently has the cartridges 101 of both the model numbers, a message indicating that the labels can be immediately prepared is displayed. In a case where the user does not have any one the cartridge 101, a message indicating that it is necessary to newly purchase a cartridge is displayed. When the user pushes any one of two buttons 62 and 63 corresponding to each of the combinations, appropriate processing of transmitting the print data generated in correspondence to the two cartridges 101 of the selected combination to the label printer 3 is performed, for example.

<Control Procedure>

In order to realize the above method, an example of a control procedure that is executed by the CPU 11 is described with reference to a flowchart shown in FIG. 13. The control procedure is executed by an edit processing program of the present embodiment, which is included in a plurality of programs stored in the ROM or the large-capacity storage device 16, so that an edit processing method of the present embodiment is realized in response to the execution.

First, in S5, in a setting screen (not shown), a setting operation of the print condition from the user via the operating device 13 is received.

Then, in S10, the maximum number of colors to be expressed is determined based on the print condition set in S5.

Then, in S15, the edit operation screen shown in FIG. 10 is displayed on the display unit 14.

In S20, an edit operation of the color arrangement pattern on the composite label LAB in the edit monitor 43 is received. Note that, S20 is an example of the reception procedure.

Then, in S25, based on a plurality of layer patterns extracted according to the print condition and the color separation table, the color separation of each region of the color arrangement pattern on the composite label LAB is performed. Note that, S25 is an example of the correlation reference procedure.

Then, in S30, based on a processing result in S25 and the cartridge management table, the tape colors, the print colors, and the model numbers of the corresponding cartridges 101 of the print labels LA and LB are determined, and are each displayed on the tape color display portions 51, the print color display portions 52 and the cartridge model number display portions 57 of the corresponding layer monitors 41 and 42.

Then, in S35, based on processing results in S20 to S30, the print patterns on each of the print labels LA and LB are generated and displayed on each of the layer monitors 41 and 42. Note that, S25 to S35 are an example of the determination procedure.

Then, in S40, it is determined whether the print button 55 is pushed to perform an operation of ending the edit. When it is determined that the operation is not performed, NO is determined and the control procedure returns to S20. When it is determined that the operation is performed, YES is determined and the control procedure proceeds to S45.

In S45, based on the cartridge management table, the use cartridge combination screen shown in FIG. 11 or 12 is displayed on the display unit 14. Note that, S30 and S45 are an example of the display procedure, and S45 of displaying a plurality of combinations of the cartridges 101 and enabling the user to select a combination is an example of the combination receiving procedure.

Then, in S50, the loop stands by until an operation is performed on the button displayed in the use cartridge combination screen. When the button is operated, the control procedure proceeds to S55.

In S55, the print data based on the print patterns on the print labels LA and LB generated in S35 is transmitted to the label printer 3 via the communication control unit 15. Thereby, based on the print data, the printing on the upper label LA and the lower label LB is performed in the label printer 3. Then, the flow is ended.

<Effects of Embodiment>

As described above, according to the present embodiment, in a state where the edit processing program of S5 to S55 is executed in the operation terminal 2, when the user performs the color-code setting for the plurality of regions in the desired color arrangement pattern on the composite label LAB that the user desires to realize, the setting is received in S20. Then, in S25 to S35, the color setting on each of the print labels LA and LB for realizing the color-coding of the color arrangement pattern on the composite label LAB corresponding to the received color-code setting is determined. Thereafter, the determined color setting is displayed on the display unit 14 of the operation terminal 2, in S30.

Thereby, the user can know at least one type of combinations of the appearance colors on each of the plurality of print labels LA and LB that can constitute a user-desired final color arrangement pattern of the appearance colors on the composite label LAB. As a result, the user can know which types of the cartridges 101 can realize the composite label LAB having a color arrangement pattern of desired appearance colors, specifically, whether it is possible to realize the composite label LAB having a color arrangement pattern of the appearance colors only by the types of the possessed cartridges 101, and if not possible, how can the appearance colors be changed for the realization only by the types of the possessed cartridges 101, for example. As a result, the convenience for the user is improved.

In addition, in the present embodiment, particularly, when laying the plurality of print labels LA and LB, in a case where a color of any one of the print labels LA and LB is non-transparent, if the order of laying the print labels LA and LB is different, the final color arrangement pattern of the appearance colors on the composite label LAB may be different.

Therefore, in the present embodiment, in S25 to S35, not only the color setting of each of the plurality of print labels LA and LB but also the distinction between the lower label LB and the upper label LA is determined, and the distinction is displayed in S45. Thereby, it is possible to accurately determine and notify the combination of the appearance colors on the plurality of print labels LA and LB that can constitute a user-desired final color arrangement pattern of the appearance colors on the composite label LAB.

Further, in the present embodiment, particularly, in S25 to S35, a plurality of patterns of a combination of the color setting for each of the print labels LA and LB and the distinction between the lower label LB and the upper label LA is determined, and is displayed in a listable manner on the display unit 14 in S30. The user designates one pattern from the listed patterns, so that the designation is received in S45. Thereby, the user can simply constitute the user-desired final color arrangement pattern of the appearance colors on the composite label LAB just by selecting one pattern from the plurality of patterns listed on the display unit 14.

Further, in the present embodiment, particularly, the identification information of the model numbers, for example, of the plurality of types of cartridges 101 in which the different types of the base material tapes 102 and the ink ribbons 106 are each accommodated is stored in the cartridge management table. In S25 to S35, from the stored model numbers of the plurality of types of cartridges 101, the model numbers of the same number of the cartridges 101 as the number of the print labels L to be overlaid are determined, so that the color setting and the distinction between the lower label LB and the upper label LA are determined. Specifically, in a case where the label printer 3 sequentially mounts the plurality of cartridges 101 each having each of the different types of the base material tapes 102 and the ink ribbons 106 to the cartridge holder 22 and prepares the various print labels L, the type of the mounted cartridge 101 and the color setting of the completed print label L correspond to each other one to one. Thereby, in S25 to S35, the color setting can be determined by determining which cartridge 101 is used.

Further, in the present embodiment, particularly, the model numbers of all types of the cartridges 101 available in the market are stored in advance in the cartridge management table, and in S25 to S35, the cartridges 101 that are used for the composite label LAB are determined out of all the types, so that the color setting and the distinction between the lower label LB and the upper label LA are determined. Thereby, the user can know which of all the cartridges 101 available in the market can be used to prepare the composite label LAB having a user-desired color arrangement pattern of appearance colors.

Further, in the present embodiment, particularly, for example, the types of cartridges 101 that are possessed or are to be purchased by the user are stored in advance in the cartridge management table, in association with the user ID. In S25 to S35, the cartridges 101 that are used for the composite label LAB are determined from the stored types of the cartridges 101, so that the color setting and the distinction between the lower label LB and the upper label LA are determined. Thereby, the user can know which of the cartridges 101, which are possessed or to be purchased, can be used to prepare the composite label LAB having a user-desired color arrangement pattern of appearance colors.

Note than, in the present embodiment, the setting contents of the tape color display portion 51 and tape color display portion 52 in each of the layer monitors 41 and 42 shown in FIG. 10 are automatically switched and displayed by the processing of the color arrangement pattern separation. However, the present invention is not limited thereto. For example, as for the print color display portion 52 in the first layer monitor 41 of the upper label LA, and the tape color display portion 51 and the print color display portion 52 in the second layer monitor 42 of the lower label LB, the setting contents may be each arbitrarily set by a designation operation from the user via the operating device 13.

In the label printer 3, the base material tape 102 and the ink ribbon 106 provided for the cartridge 101 are used, and the print head 29 is configured to perform printing on the cover film 104 to be bonded to the base material tape 102 with using the ink ribbon 106. In correspondence to this, when any designation operation on the tape color display portion 51 and the print color display portion 52 by the user is received, the tape color setting of the base material tape 102 and the print color setting of the ink ribbon 106 are received as the color-code setting on the composite label LAB, in S20 that is executed by the CPU 11 of the operation terminal 2. Thereby, the user can designate what color of the printing should be formed on the base material tape 102 having what a color, in each region of the composite label LAB, as for a desired appearance.

Further, in the present embodiment, the color setting and the distinction between the lower label LB and the upper label LA are determined in S25 to S35 so that the color-code setting received in S20 is realized as the tape colors or the print colors of the print labels LA and LB to be overlaid are mixed. Thereby, when the plurality of print labels LA and LB is laid and pasted to form the composite label LAB, the final tape color or print color of the appearance of the composite label LAB can be expressed by mixing the tape colors or print colors of the print labels LA and LB.

Note that, in the present embodiment, the setting content of the tape color display portion 51 in the second layer monitors 42 shown in FIG. 10 is automatically switched and displayed by the processing of the color arrangement pattern separation. However, the present invention is not limited thereto. For example, as for the tape color display portion 51 in the second layer monitor 42 of the lower label LB, the setting content may be arbitrarily set by a designation operation from the user via the operating device 13.

In this case, in S20, the user's designation on the tape color of the lower label LB is received, and in S25 to S35, the color setting and the distinction between the lower label LB and the upper label LA are determined according to the receiving result. Note that, in this case, S20 is an example of the tape color receiving procedure. Thereby, when mixing the tape colors or print colors of the plurality of print labels LA and LB, the tape color of one print label L is limited to one color desired by the user and the other is appropriately adjusted to express the tape color or print color on the composite label LAB.

Further, in the present embodiment, particularly, the pure color 1 that is one color type, the pure color 2 that is another color type, and a mixed color that is a color type obtained as a result of mixing the pure colors are associated as mixed color correlation, and the mixed color correlation is stored in the color separation table. In S25 that is executed by the CPU 11, the mixed color correlation of the color separation table is referred to, and in S30 and S35, the color setting and the distinction between the lower label LB and the upper label LA are determined based on the reference result. In this way, the pure colors 1 and 2 before color mixing and the mixed color after color mixing are stored in association with each other, so that the determination on the color setting and the distinction between the lower label LB and the upper label LA in S25 to S35 on the premise of realizing the color-code setting by color mixing can be smoothly and rapidly performed.

MODIFIED EMBODIMENTS

Note that, the present invention is not limited to the above embodiment, and can be variously modified without departing from the gist and technical spirit thereof. In the below, such modified embodiment is described according to procedures. The parts equivalent to the above embodiment are denoted with the same reference signs, and the descriptions thereof are appropriately omitted or simplified.

(1) A Case where the Color-Code Setting is Realized by Simple Region Division without Mixing Colors In the present modified embodiment, when the print control of giving transparency with the print colors of the print labels LA and LB cannot be performed, i.e., when color mixing cannot be performed, for example, a method of the color-code setting for securing colors to be expressed as many as possible is described.

Figure 14A:
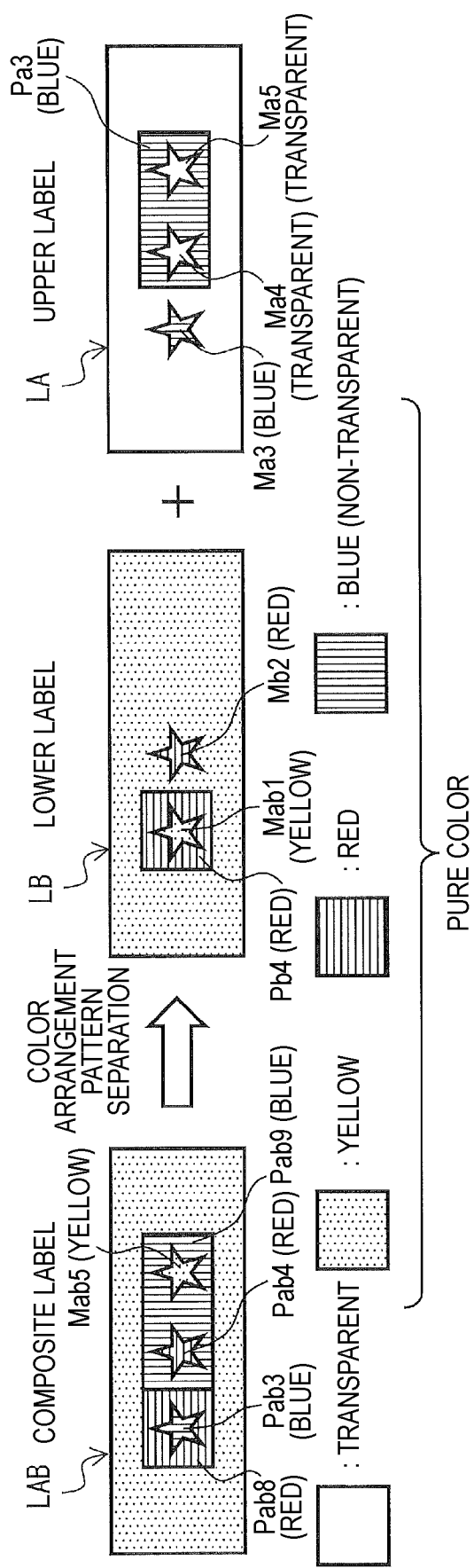

The method of the present modified embodiment is described with reference to FIGS. 14A and 14B corresponding to FIGS. 4A and 4B. FIG. 14A shows an example where the color arrangement pattern is separated from the color arrangement pattern of one composite label LAB into the print patterns of the two print labels LA and LB by the method of the present modified embodiment. FIG. 14B shows all layer patterns that can be applied in the color arrangement pattern separation of FIG. 14A.

In the example shown in FIG. 14A, a red rectangle Pab8 and a blue rectangle Pab9 are closely formed side by side in corresponding order from the left on the tape color of yellow, in a color arrangement pattern on the composite label LAB. The blue rectangle Pab9 is formed to have a twice size as large as the red rectangle Pab8, in the tape length direction. In the red rectangle Pab8, a blue star-shaped mark Mab3 is formed, and in the blue rectangle Pab9, a red star-shaped mark Mab4 and a yellow star-shaped mark Mab5 are formed side by side from the left. In the case of such color arrangement pattern, the number of colors to be expressed is three, and even though colors are not mixed, the color arrangement pattern can be separated with the color-code setting of the tape color of yellow and the print color of red of the lower label LB and the print color of blue of the upper label LA, as shown, for example.

Specifically, on the lower label LB, the tape color is set yellow, and a print pattern of a rectangle Pb4 of the print color of red, in which a shape of a star-shaped mark Mb1 has been removed, and a star-shaped mark Mb2 of the print color of red is formed. In addition, on the upper label LA, the tape color is transparent, and a print pattern of a star-shaped mark Ma3 of the print color of blue located at the left and a rectangle Pa3 of the print color of blue, in which two star-shaped marks Ma4 and Ma5 have been removed, is formed. In this case, even when the print patterns of the respective print colors are interchanged between the lower label LB and the upper label LA, a similar color arrangement pattern on the composite label LAB can be realized.

In this way, the reason for the compatibility of the print color and the print pattern between the lower label LB and the upper label LA is that the layer pattern J-IV in FIG. 4B superposing the two prints is excluded. Specifically, in the color-code setting by the present modified embodiment, as shown in FIG. 4B, the color-code setting is made so that only the layer patterns J-I, J-II and J-III are applied and only one print color is shared to each region.

Note that, in the example of the above color arrangement pattern separation, the region of the print pattern of the print color of red on the composite label LAB is an example of the first region, the setting of red is an example of the first color-code setting, the region of the print pattern of the print color of blue on the composite label LAB is an example of the second region, and the setting of blue is an example of the second color-code setting. In addition, the lower label LB is an example of the first print label, the region of the print pattern on the lower label LB is an example of the third region, the upper label LA is an example of the second print label, and the region of the print pattern on the upper label LA is an example of the fourth region.

Effects of Modified Embodiment

In the present modified embodiment, the similar effects to the above embodiment are obtained.

In addition to the above, in the present modified embodiment, particularly, for example, when the color-code setting for the region of the print color of red and the region of the print color of blue on the composite label LAB is received in S20, the color expression of the region of the print color of red is allotted to the lower label LB, and the color expression of the region of the print color of blue is allotted to the upper label LA. Specifically, the color-code setting of the print color of red is made for a region of the print pattern of the lower label LB, which corresponds to the region of the print color of red, so that the color expression equivalent to the color-code setting for the region of the print color of red on the composite label LAB is performed on the lower label LB. Similarly, the color-code setting of the print color of blue is made for a region of the print pattern of the upper label LA, which corresponds to the region of the print color of blue, so that the color expression equivalent to the color-code setting for the region of the print color of blue on the composite label LAB is performed on the upper label LA. Thereby, the color-code setting received in S20 can be realized by the color assignment on each of the plurality of print labels LA and LB corresponding to the colors of each of the plurality of regions on the composite label LAB, not the mixed colors of the tape colors or print colors of the print labels LA and LB.

(2) Others

In the above, the printing is performed on the cover film 104 separate from the base material tape 102, which are then bonded. However, the present invention is not limited thereto. For example, the present invention may also be applied to a method (in which the bonding is not performed) of performing printing on a printed tape layer provided for the base material tape.

Figure 13:
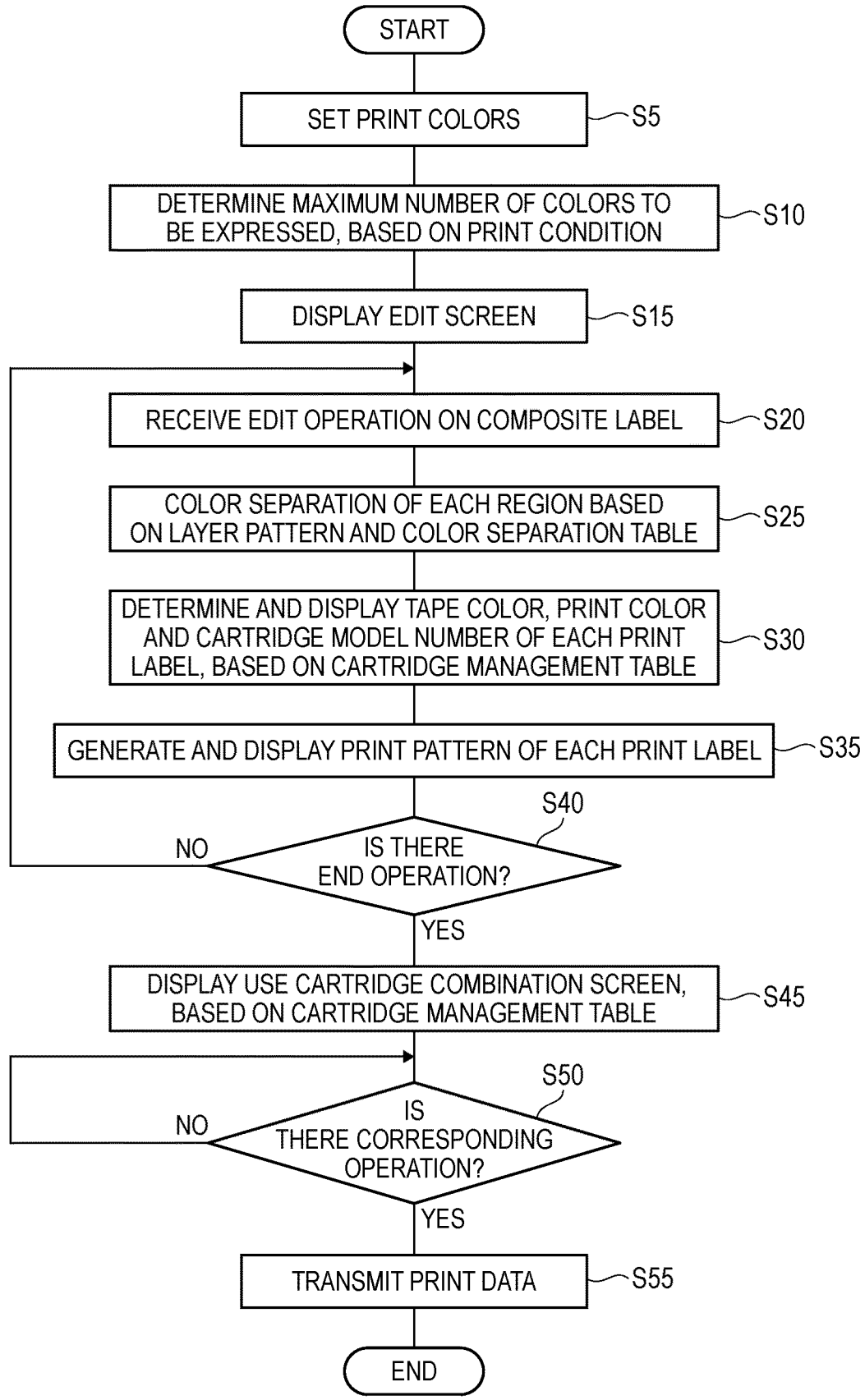
FIG. 13 is a flowchart showing an example of a control procedure that is executed by a CPU.

In addition, the flowchart shown in FIG. 13 does not limit the present invention to the procedures shown in the flowchart. For example, the procedure may be added or deleted or the sequence may be changed without departing from the gist and technical spirit of the present invention.

In addition to the above, the methods of the above embodiment and each modified embodiment may be appropriately combined and used.

Although not exemplified in detail, the present invention is implemented with being variously changed without departing from the gist thereof.

What is claimed is:

1. A non-transitory computer-readable storage medium storing an edit processing program, when executed by a controller of a terminal device that enables to be connected to a printing device comprising a mount unit on which a medium storage body accommodating a print medium is mounted and a print unit which performs desired printings using different types of the print medium, and configured to prepare a plurality of print labels which are laid and pasted in a thickness direction of the print labels to constitute a print label body, the edit processing program configured to cause the controller of the terminal device to perform:

a reception procedure of receiving a color-code setting for each of a plurality of regions provided on the print label body;

a determination procedure of determining a color setting on each of the plurality of print labels so as to realize a color-coding on the print label body corresponding to the color-code setting received in the reception procedure; and a display procedure of displaying, on a display unit of the terminal device, the color settings on the plurality of print labels determined in the determination procedure.

2. The non-transitory computer-readable storage medium according to claim 1, wherein the edit processing program is configured to cause the controller to perform the determination procedure to further determine an order of laying the plurality of print labels, and wherein the edit processing program is configured to cause the controller to perform the display procedure to further display, on the display unit, the order of laying the plurality of print labels determined in the determination procedure.

3. The non-transitory computer-readable storage medium according to claim 2, wherein the edit processing program is configured to cause the controller to perform the determination procedure to determine a plurality of patterns of a combination of the color setting and the order of laying the print labels, wherein the edit processing program is configured to cause the controller to perform the display procedure to display, in a listable manner on the display unit, the plurality of patterns determined in the determination procedure, and wherein the edit processing program is configured to cause the controller to further perform a combination receiving procedure of receiving a designation on one of the plurality of patterns displayed in the listable manner.

4. The non-transitory computer-readable storage medium according to claim 2, wherein the edit processing program is configured to cause the controller to perform the determination procedure to determine the color setting and the order laying the print labels, by determining the medium storage bodies as many as the print labels to be laid, out of a plurality of types of the medium storage bodies each accommodating each of different types of the print medium memorized in advance.

5. The non-transitory computer-readable storage medium according to claim 4, wherein the edit processing program is configured to cause the controller to perform the determination procedure to determine the color setting and the order of laying the print labels out of all types of the medium storage bodies memorized in advance as medium storage bodies available in a market.

6. The non-transitory computer-readable storage medium according to claim 4, wherein the edit processing program is configured to cause the controller to perform the determination procedure to determine the color setting and the order of the laying the print labels out of types of the medium storage bodies memorized in advance in association with user identification information or memorized in advance in association with the printing device.

7. The non-transitory computer-readable storage medium according to claim 2, wherein the print medium includes a printed tape and an ink ribbon used when the print unit performs printing on the printed tape, wherein the color-code setting includes:
a tape color setting of the printed tape; and
a print color setting by the ink ribbon, and wherein the edit processing program is configured to cause the controller to perform the reception procedure to receive at least one of the tape color setting or the print color setting.

8. The non-transitory computer-readable storage medium according to claim 7, wherein the edit processing program is configured to cause the controller to perform the determination procedure to determine the color setting and the order of laying the print labels such that the color-code setting received in the reception procedure is realized by at least one of a mixed color of tape colors of the plurality of print labels to be laid and a mixed color of print colors.

9. The non-transitory computer-readable storage medium according to claim 8, wherein the edit processing program is configured to cause the controller to further perform a tape color receiving procedure of receiving a designation of the tape color of one of the plurality of print labels, and wherein the edit processing program is configured to cause the controller to perform the determination procedure determine the color setting and the order of laying the print labels according to a receiving result in the tape color receiving procedure.

10. The non-transitory computer-readable storage medium according to claim 8, wherein the edit processing program is configured to cause the controller to further perform a correlation reference procedure of referring to a mixed color correlation where one color type, other color type and a color type obtained as a result of mixing the two color types are associated with one another, and wherein the edit processing program is configured to cause the controller to perform the determination procedure to determine the color setting and the order of laying the print labels based on a reference result of the mixed color correlation in the correlation reference procedure.

11. The non-transitory computer-readable storage medium according to claim 2, wherein the color-code setting received in the reception procedure includes a first color-code setting in a first region on the print label body and a second color-code setting in a second region on the print label body, and wherein the edit processing program is configured to cause the controller to perform the determination procedure to determine the color setting and the order of laying the print labels such that the color-code setting received in the reception procedure is realized by a first color-code setting in a third region on a first print label corresponding to the first region and a second color-code setting in a fourth region on a second print label corresponding to the second region.

12. An edit processing method performed by a terminal device which enables to be connected to a printing device on which a medium storage body accommodating a print medium is mounted, the printing device configured to perform desired printings using different types of the print medium, and configured to prepare a plurality of print labels which are laid and pasted in a thickness direction of the print labels to constitute a print label body, the edit processing method comprising the steps of:

receiving a color-code setting for each of a plurality of regions provided on the print label body;

determining a color setting on each of the plurality of print labels so as to realize a color-coding on the print label body corresponding to the received color-code setting; and displaying, on a display unit of the terminal device, the determined color setting on the plurality of print labels.

* * * * *